(12) United States Patent
Carter

(10) Patent No.: US 8,937,621 B2
(45) Date of Patent: Jan. 20, 2015

(54) METHOD AND SYSTEM FOR DISPLAY OUTPUT STUTTER

(75) Inventor: Collis Quinn Troy Carter, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 903 days.

(21) Appl. No.: 12/604,216

(22) Filed: Oct. 22, 2009

(65) Prior Publication Data

US 2011/0096079 A1 Apr. 28, 2011

(51) Int. Cl.
*G06F 13/14* (2006.01)
*G06F 1/00* (2006.01)
*G06F 1/32* (2006.01)

(52) U.S. Cl.
CPC ............ *G06F 1/3203* (2013.01); *G06F 1/3265* (2013.01); *Y02B 60/32* (2013.01); *Y02B 60/1242* (2013.01)
USPC ............................ 345/520; 713/323; 713/320

(58) Field of Classification Search
None
See application file for complete search history.

(56) References Cited

U.S. PATENT DOCUMENTS

| | | | | |
|---|---|---|---|---|
| 5,615,376 | A * | 3/1997 | Ranganathan | 713/322 |
| 5,821,924 | A * | 10/1998 | Kikinis et al. | 345/212 |
| 6,121,962 | A | 9/2000 | Hwang | |
| 6,137,473 | A | 10/2000 | Cortopassi et al. | |
| 2002/0036625 | A1 | 3/2002 | Nakamura | |
| 2002/0103919 | A1 * | 8/2002 | Hannaway | 709/231 |
| 2002/0190977 | A1 * | 12/2002 | Oshima et al. | 345/212 |
| 2003/0131274 | A1 * | 7/2003 | Mizuyabu et al. | 713/324 |
| 2004/0233190 | A1 * | 11/2004 | Chow | 345/204 |
| 2008/0168264 | A1 * | 7/2008 | Sebestian et al. | 713/1 |
| 2008/0196044 | A1 * | 8/2008 | Stanley | 719/319 |
| 2009/0046205 | A1 | 2/2009 | Strasser et al. | |
| 2009/0070479 | A1 * | 3/2009 | Anderson et al. | 709/232 |
| 2009/0092011 | A1 * | 4/2009 | Matsushita et al. | 369/47.5 |
| 2009/0141197 | A1 | 6/2009 | Kim | |
| 2009/0327777 | A1 * | 12/2009 | Vasquez et al. | 713/320 |

OTHER PUBLICATIONS

International Search Report and Writeen Opinion, dated Jul. 6, 2011, for PCT Appl. No. PCT/IB2010/002668, filed Dec. 19, 2010, 12 pages.

* cited by examiner

*Primary Examiner* — Xiao Wu
*Assistant Examiner* — Yingchun He
(74) *Attorney, Agent, or Firm* — Volpe and Koenig, P.C.

(57) ABSTRACT

Apparatus and methods for reducing power consumption of a data transfer interface in a computer system are disclosed. In one embodiment, a method for reducing power consumption of a data transfer interface between a first device and a second device, includes, identifying a free interval between a first data and a second data, disabling the data transfer interface during the free interval, enabling the data transfer interface at the end of the free interval, and transmitting the second data. The method may also include a step of notifying the second device that the data transfer interface is being temporarily disabled. Another embodiment, for example, includes the transfer of display data (or video frames) over an interface, such as, a DisplayPort interface, between a graphics controller device and a timing controller device in a computer system.

18 Claims, 5 Drawing Sheets

METHOD AND SYSTEM FOR DISPLAY OUTPUT STUTTER

BACKGROUND OF THE INVENTION

1. Field of the Invention

The present invention relates generally to reducing the power consumption of video display devices.

2. Background Art

Laptop computers, for example, have limited battery life, and therefore conserving power on such devices is particularly important. Display of video consumes substantial amounts of power in devices such as laptops. The degree of power consumption of video display devices is affected by a number of factors, including, display size, display clock rate, display resolution, brightness, display enhancements such as backlit display, type of graphic processor, connection between graphics processor and the display, etc.

Efforts to better utilize available battery power related to the display device include actively managing the brightness, backlighting, display clock rate, power-saving modes for the display, etc. However, such measures of active management can reduce functionality and/or availability of resources to the user.

Another technique to reduce power consumption and extend battery life is to maintain the interface between the graphics processing device and the display device at slower rates. However, when a particular amount of video data is transferred over the interface, the overall savings in power achieved by slowing the interface, if at all, may not be significant.

Video is generally transferred between devices in a frame-based format. For example, a video encoder would encode a frame of video and then transmit it. A video display device will receive and display an entire frame before data from the next frame is rendered and displayed. Sophisticated techniques exist for rendering the display of a frame on a screen so that various quality and performance criteria are satisfied.

What are needed, therefore, are methods and systems that reduce power consumption of video display devices that take advantage of the frame-by-frame nature of video data streams.

BRIEF SUMMARY OF THE INVENTION

Apparatus and methods for reducing power consumption of a data transfer interface in a computer system are presented. In one embodiment, a method for reducing power consumption of a data transfer interface between a first device and a second device includes, identifying a free interval between a first data and a second data, disabling the data transfer interface during the free interval, enabling the data transfer interface at the end of the free interval, and transmitting the second data. The method may also include a step of notifying the second device that the data transfer interface is being temporarily disabled.

Another embodiment includes the transfer of display data (or video frames) over an interface, such as, a DisplayPort interface, between a graphics controller device and a timing controller device in a computer system. The free interval may be a blanking interval between video frames.

In another embodiment, a method for use in a timing controller device for reducing the power consumption in a display includes, receiving an indication from a graphics controller that an interface will be temporarily shutdown, and freezing a display displaying a first video frame. The method for used in a timing controller, may also include a step of receiving a second video frame for displaying in the display. The second video frame may be an activation indication that represents the re-enabling of the previously disabled interface.

A graphics controller apparatus, according to another embodiment, includes, an output stutter control module configured to identify a blanking interval between a first and a second video frame, notify a display controller that an interface between the graphics controller and the timing controller will be shut down temporarily, disable the interface during the blanking interval, and enable the interface at the end of the blanking interval.

A timing controller apparatus according to yet another embodiment includes, a receiver output stutter control module configured to receive an indication from a graphics controller that an interface will be temporarily shutdown, and to freeze a display displaying a first video frame. The receiver output stutter control module may be further configured to receive a second video frame for displaying in the display. The second video frame can be an activation indication corresponding to a re-enabling of the previously disabled interface.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF THE INVENTION

Figure 1:
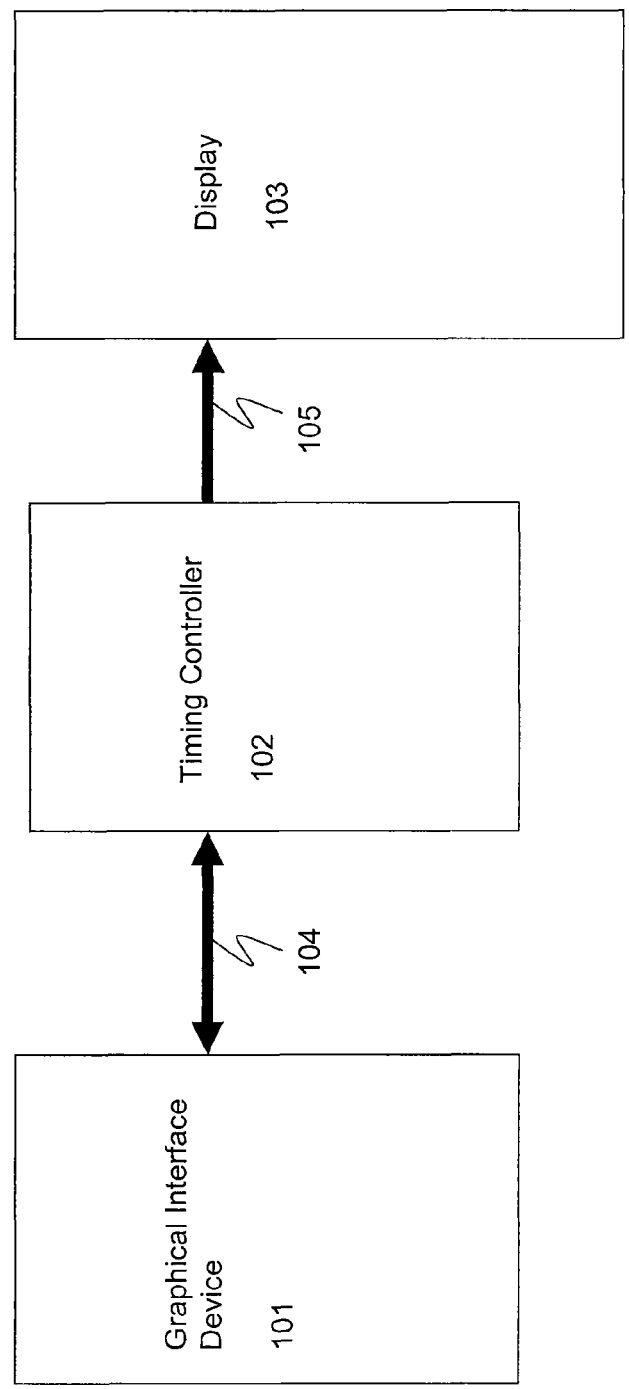
FIG. 1 shows a system, according to an embodiment of the present invention.

Embodiment of the present invention may enable substantial power savings in the display of video in various display devices. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system or computing device where an interface is operated between a graphics controller device and a display device. For example and without limitation, embodiments may include computers including laptop computers, personal computers, or any other computer with a display terminal, game platforms, entertainment platforms, personal digital assistants, and video platforms including, such as, flat-panel television displays.

As noted in the background section, the display device (e.g., laptop display) is itself a substantial power consumer in systems such as computer systems. Laptop computers are an example where embodiments of the present invention may be most beneficial. The limited battery power capacity of devices such as laptops increases the importance of techniques that can save power, and therefore can yield extended battery life. Example devices in which embodiments of the present invention can be advantageously implemented include laptop computer displays, all-in-one personal computers, television displays, and applications of embedded DisplayPort interface.

Embodiments of the present invention take advantage of the frame-by-frame transmission of video data over an interface between a graphics controller device and a timing controller device. Embodiments of the present invention can result in substantial advantages over the conventional methods of preserving battery power by, for example, running the interface to the timing controller device at a slower rate. For example, in transmitting a fixed amount of video data (e.g., a fixed number of video frames) across the interface between the graphics controller device and a timing controller device, slowing the rate of operation of the interface may not reduce the total amount of power consumed. Embodiments of the present invention, in contrast to conventional methods, can enable and disable the interface between the graphics controller device and a timing controller device such that the interface is disabled for the duration of the interval between frames. With such active control of the interface, the consumption of battery power during those frequently occurring frame intervals is either reduced or eliminated. In one embodiment, for example, the interface can be run at maximum transfer speed for the duration of transferring one frame, and completely shutdown for the duration of the blanking interval between two frames.

FIG. 1 is system according to an embodiment of the present invention. System 100 includes a graphics controller device 101, a timing controller device 102, and display device 103. Graphics controller device 101 is coupled to timing controller device 102 with an interface 104. Timing controller 102 is coupled to display device 103 with an interface 105.

Graphics controller device 101 may be coupled to numerous other hardware or software components in, for example, a computer system. Graphics controller device 101 may be a dedicated graphics card that plugs into the motherboard of a computer system, a part of another component card that plugs into the motherboard, or an integrated part of the motherboard. For example, graphics controller device 101 may plug into a Peripheral Component Interface (PCI) bus through which the central processor unit (CPU) of the computer system connects to other components of the computer system. Receiving of video from an external source (not shown), creation and/or editing of video may take place in graphics controller device 101. The video created and/or edited or otherwise processed in graphics controller device 101 is then framed for transmission to timing controller device 102. More details of device 101 are described below with respect to FIG. 2.

Interface 104 between graphics controller device 101 and timing controller 102 may include a data path as well as a path for control signals. In one embodiment, interface 104 may be implemented as a ribbon-cable connecting graphics controller device 101, for example, included in the motherboard of laptop computer, and timing control device 102, for example, included in the display of a laptop. A ribbon-cable includes multiple wire-pairs, each wire-pair being referred to as a lane. Each lane, in many embodiments, includes a corresponding output driver in the graphics controller device and a receiver in the timing controller device. Interface 104 may support one or more of interface standards, such as, but not limited to, DisplayPort interface standard, High Definition Multimedia Interface (HDMI) standard, Digital Visual Interface (DVI), Video Graphics Array (VGA) or its variants, and Low Voltage Differential Signaling (LVDS). In one embodiment, interface 104 is a ribbon-cable supporting the DisplayPort interface standard. DisplayPort is an industry standard interface that is designed to overcome many of the limitations of older interface standards.

The data transmitted over interface 104 can include pixel data, such as, red green blue (RGB) color sample data for each pixel. The control information transmitted over interface 104 can include timing synchronization signals such as, for example, horizontal sync signals, vertical sync signals, and data enable signals.

Timing controller device 102 includes hardware and software modules to receive video frames and to process received video frames for display on display device 103. Timing controller 102 may, for example, include the functionality to display each frame or each component thereof on display 103. For example, timing controller 102 may generate the data signals and the gate control signals required to display each of the video frames on an LCD of display 130. Further details of timing controller device 102 are described below with respect to FIG. 3.

Display 103 can be any display device or screen such as a cathode ray tube (CRT) or a flat panel display. Flat panel displays come in many forms, liquid crystal displays (LCD), electroluminescent displays (ELD) and active-matrix thin-film transistor displays (TFT) being examples. For example, in computer systems such as laptop computers, the display is generally a flat panel display. Display 103 may receive data to be displayed, locations on the display device to be updated, as well as any timing information, over interface 105.

Figure 2:
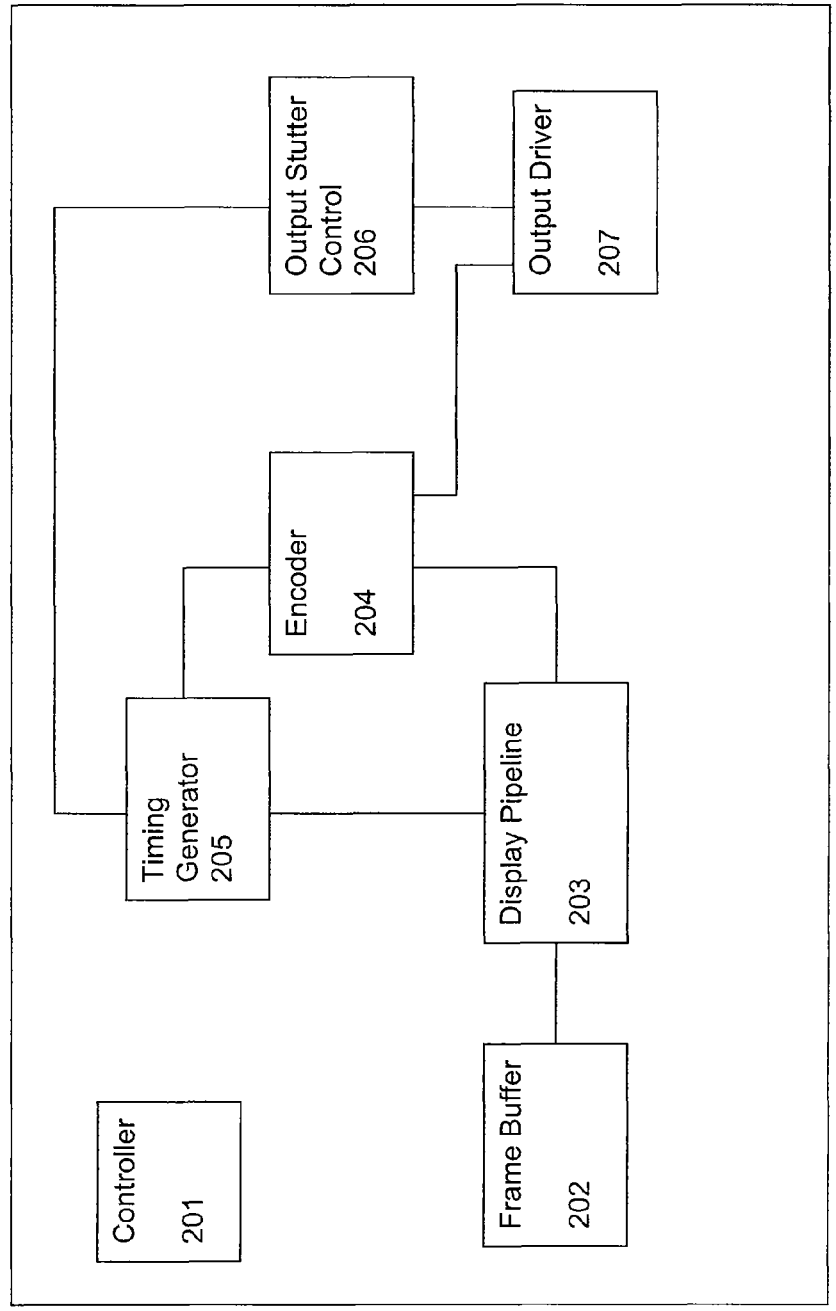
FIG. 2 is a graphics controller device according to an embodiment of the present invention.

FIG. 2 shows more details of graphics controller device 101 according to an embodiment of the present invention. Graphics controller device 101 includes a controller 201, a frame buffer 202, a display pipeline 203, an encoder 204, a timing generator 205, an output stutter control device 206 and an output driver 207. Controller 201 may be any processor including a central processor unit (CPU) or graphics processor unit (GPU). Controller 201 controls the operation of devices in graphics controller device 101. For example, controller 201 can execute the logic instructions implementing one or more of, display pipeline 203, encoder 204, timing generator 205, output stutter control device 206, and output driver 207. In other embodiments, there may be no separate controller 201 present in graphics controller device 101, and devices in graphics controller device 101 may be controlled by a central processor unit (CPU) that controls one or more components of a computer system including graphics controller device 101. The logic instructions of devices 203-207 can be implemented in software, hardware, or a combination thereof. For example, in one embodiment, logic instructions of one or more devices 203-207 can be specified in a programming language such as C, C++, or Assembly. In another embodiment, logic instructions of one or more devices 203-207 can be specified in a hardware description language such as Verilog, RTL, and netlists, to enable ultimately configuring a manufacturing process through the generation of maskworks/photomasks to generate a hardware device embodying aspects of the invention described herein.

Frame buffer 202 includes one or more memory devices, for example, dynamic random access memory (DRAM) devices. Frame buffer 202 is used to hold video data in memory while processing including the processing in display pipeline 203 and encoder 204 is in progress. Frame buffer 202 or other memory devices (not shown) are used for holding the video data, before and after the encoding of the video data into video frames, until the respective frames are transmitted out of output driver 207. Frame buffer 201 may hold any data that is actually output to display 103.

Display pipeline 203 includes the functionality to process video data content. For example, incoming video in MPEG2 format may be decoded, reformatted, and reframed as appropriate for local raster scan display in display pipeline 203. Display pipeline 203 may generate a stream of video frames as output. For example, the pixel data to be displayed can be output from display pipeline 203 in the form of a raster scan, i.e., output line-by-line, left-to-right and top-to-bottom of the display. The stream of video frames may then run through encoder 204. Encoder 204 may encode the stream of video frames according to a predetermined encoding and/or compression standard. For example, encoder 204 may encode the stream of data output from display pipeline in a transport and display format required by interface 104 and/or display 103. Encoder 204 may encode the data according to a customized format or according to a standard such as DisplayPort, embedded DisplayPort, DVI, LVDS, or HDMI. In some embodiments, encoder 204 may encode the video frames according to the Motion Picture Experts Group version 2 (MPEG2) video compression standard. In some embodiments, encoder 204 may be integrated in display pipeline 203, in which case, the output from display pipeline 203 may be a stream of encoded frames. The speed of operation of display pipeline 203 may be a primary factor in the quality of the image displayed. For example, complex graphics such as that generated in fast-paced games or certain video scenes may require that the display pipeline processes frames at a very fast rate where each frame also includes complex graphics. The speed of operation of display pipeline 203 may be controlled by control processor 201 using one or more clocks that regulates the pixel processing speed and that regulates the speed of operation of the interface between display pipeline 203 and frame buffer 202.

Timing generator device 205 receives the video frames output from encoder 204 as well as other control information from display pipeline 203. Control information may include framing information, such as, frame interval, frame length, etc. Timing generator 205 generates timing including either a preconfigured or dynamically configurable interframe interval (i.e., blanking interval). For example, timing generator 205 may ensure that the interframe interval between any two video frames in the stream of frames transmitted out of device 205 is constant. Timing generator 205 may also generate control signals including horizontal sync and vertical sync signals for each frame.

Data and control information from timing generator 205 are processed through output stutter control device 206 before reaching output driver device 207. In some embodiments video data may be directly received by output driver device 207, while control information may flow through output stutter control device 206.

Output stutter control device 206 includes the functionality to enable and disable interface 104. For example, at a predetermined time period prior to the end of a frame being currently transmitted, output stutter control device 206 determines to disable interface 104, and when the transmission of that frame is complete, a notification message is transmitted to timing controller device 102, and interface 104 disabled thereafter. Output stutter control device 206 subsequently re-enables interface 104 in time to transmit the next frame. Output stutter control device 206 may re-enable interface 104 using timing information received either from timing generator 205, a separate timing source, such as a clock, or based on received frames. For example, output stutter control module 206 can detect the start of a frame by monitoring a frame counter maintained by timing generator 205. In one embodiment, enabling and disabling interface 104 includes respectively enabling and disabling output driver 207.

In some embodiments, output stutter control device 206 can also disable other power consuming elements, such as, for example, the memory interface between display pipeline 203 and frame buffer 202. Circuitry in output stutter control device 206 may determine whether the memory interface can be disabled for part or all of the duration of the blanking interval. In many embodiments of the present invention, the effectiveness of the scheme to reduce power consumption is greater as the ratio between the total time to transfer an amount of video content and the time during which the interface can be disabled according to the teachings of this disclosure is increased. For example, the ratio can be increased by running the interface at the maximum transfer rate on all lanes when a frame is being transferred.

Output driver 207 includes functionality to transmit frames over interface 104. Output driver 207 also includes the functionality to transmit any required control signals over interface 104. In an embodiment, output driver 207 can include a differential transmitter. For example, in one embodiment, output driver 207 includes functions necessary to transmit video frames and control information over interface 104 using the low-voltage differential signaling interface standard (LVDS). Differential transmitters, in general, consume less power because data transmission relying on differentiation of corresponding positive and negative signals can be achieved with a lower voltage compared with data transmission using voltage variation.

Figure 3:
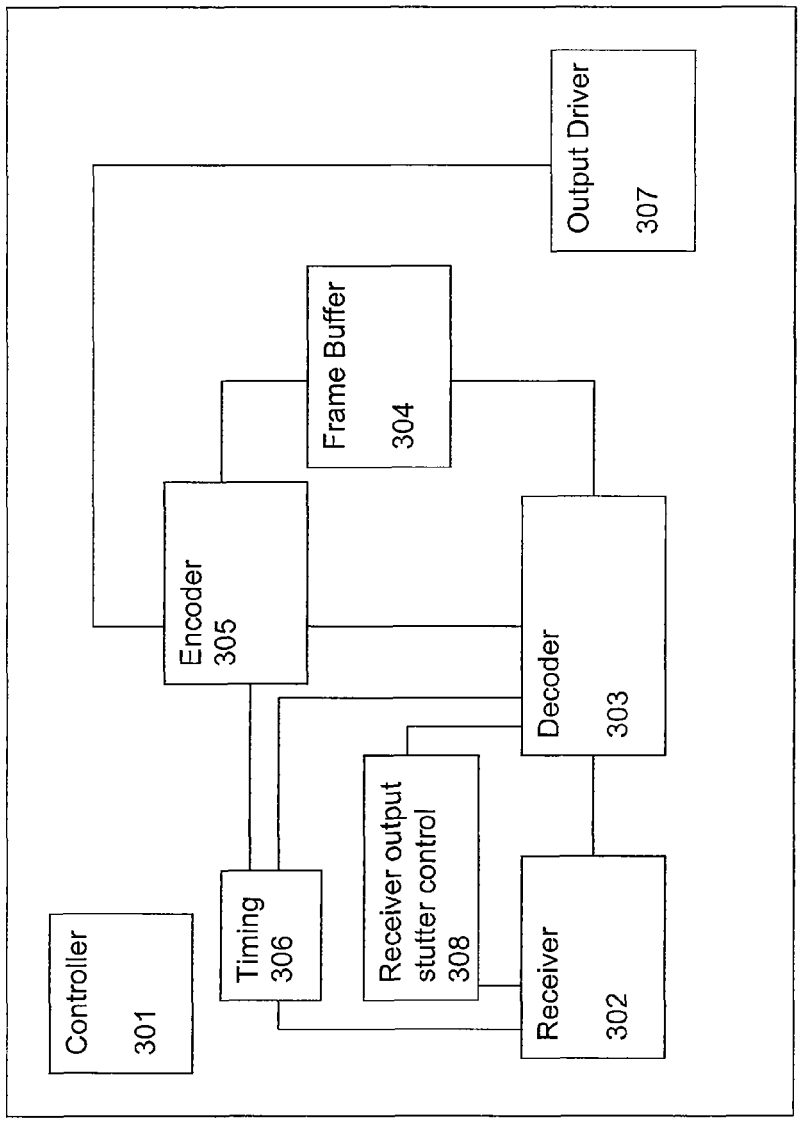
FIG. 3 is a timing controller device according to an embodiment of the present invention.

FIG. 3 shows components of timing controller device 102, according to an embodiment of the present invention. Timing controller device 102 can include a processor or controller 301, a receiver 302, a decoder 303, a frame buffer 304, an encoder 305, a timing device 306, an output driver device 307, and a receiver output stutter control module 308. Controller 301 may include the same or similar device as controller 201, or a different type of processor than controller 201. The functionality of controller 301 includes the execution of logic instructions that implements one or more of the devices 302-307.

Receiver 302 is coupled to interface 104 to receive video data and control signals from output driver 207 of graphics controller device 101. In one embodiment, where output driver 207 is configured to use the LVDS standard for transmitting video and control information over interface 104, receiver 302 is configured to receive video frames and control information from interface 104 according to the LVDS standard. The received control information can include timing synchronization signals such as, for example, horizontal sync signals, vertical sync signals, and data enable signals. In some embodiments of the present invention, receiver 302 may be a differential receiver, for example, in embodiments where output driver 207 includes a differential transmitter.

Receiver output stutter control device 308 is coupled to interface 104, directly or through receiver 302, in particular, to receive and respond to interface control messages sent by graphics controller device 101. For example, receiver output stutter control device 308 may receive a message over interface 104 indicating that the interface 104 is about to be temporarily shutdown. Upon receipt of this message, receiver output stutter control device 308 can distinguish the subsequent absence of incoming data as temporary (in contrast to the absence of data over interface 104 when a video stream is completed or terminated) and can initiate appropriate action in timing controller device 102. In one embodiment, for example, receiver output stutter control device 308 can trigger encoder 305 and timing device 306 to generate instructions to display device 103 to freeze the display, i.e., maintain the currently displayed image on the display. In some embodiments, display device 103 may be directed to freeze the currently displayed image by retransmitting the data of the last transmitted frame from frame buffer 304. In other embodiments, a control signal, such as, for example, a data enable signal with an extended time interval may be sent to display device 103.

The received video frames and control information are then input to decoder device 303. Decoder 303 decodes the encoded frames, for example, frames encoded in MPEG 2 format in the graphics controller device 101 can be decoded in decoder 303. Decoder 303 may operate using a frame buffer 304 which may be any type of memory buffer, such as, including but not limited to, DRAM. For example, the frame to be decoded as well the decoded frame may be held in frame buffer 304. Decoder 303 may also include added functionality to perform any kind of processing on the decoded video data.

The video frames may then be encoded by encoder device 305. For example, encoding may result in each video frame being encoded separately as horizontal pixel rows and as vertical pixel columns. The form of encoding done in encoder 305 can be particular to the characteristics of display 103 and/or interface 105.

The encoded data is then processed by output driver 307 to be transmitted to display 103 over interface 105. The timing corresponding to encoded data and the display of that data on display 103 may be generated by timing device 306. The video data and any control information are then transmitted over interface 105 to display 103.

Figure 4:
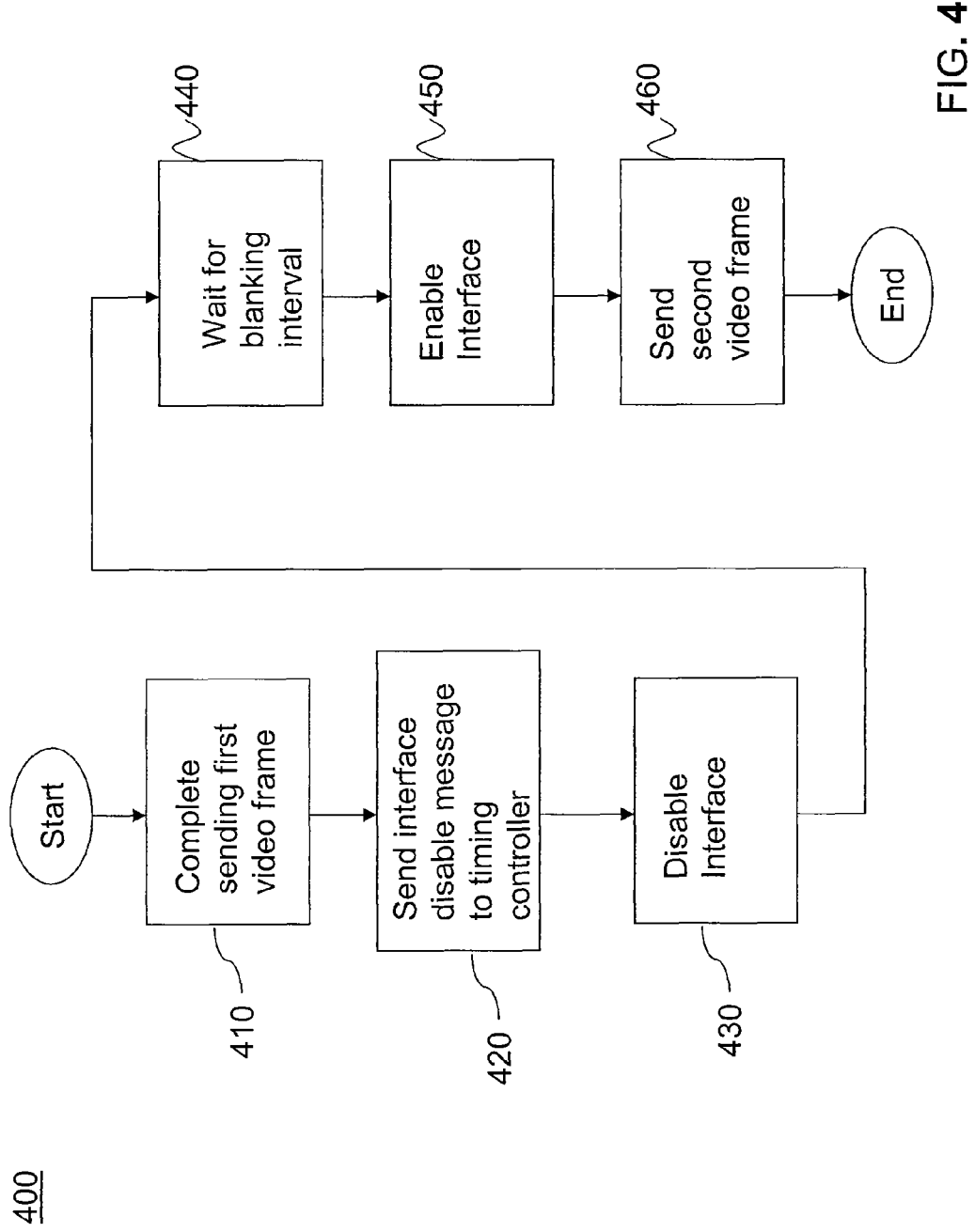
FIG. 4 is a flowchart showing steps in a process implemented in the graphics controller device according to an embodiment of the present invention.

FIG. 4 is a flowchart of the processing steps, according to one embodiment of the present invention, executed in the graphics controller device 101. In step 410, a device, such as, for example, output stutter control device 206, detects that the transmission of a frame has been completed. In step 410, the end of transmission of the frame may be detected based on when the last bit of the frame is transmitted out of output driver 207 of graphics controller device 101.

In step 420, a device in graphics controller device 101, for example, output stutter control device 206, transmits a message that is intended to inform timing control device 102 that interface 104 is being disabled. The message may be implemented as a control signal or data packet. Implementing the message as a short control signal may be desired for reasons of efficiency. However, embodiments of the present invention may include messages being implemented as control signals and/or data packets that contain the disable notification as well as additional information such as an expected time of disabling, and the time duration the interface will be disabled. Embodiments of the present invention may use the built-in command interface, training sequence, and video stream status indicator of the embedded DisplayPort and external DisplayPort interface standards.

In step 430 the interface over which video data and control messages are transmitted from graphics controller device 101 to timing controller device 102, for example, interface 104, is disabled. The disabling of interface 104 can be initiated by, for example, the output stutter control device 206. In many embodiments of the present invention, disabling of interface 104 causes that interface to consume no power until it is re-enabled. Some embodiments of the present invention include a mode in which the disabling of interface 104 in step 430 causes interface 104 to transition to a low power mode in which the substantially less power is consumed when compared to the normal operating mode. For example, in a low power mode only a minimal number of lanes in the ribbon-cable of interface 104 may be enabled.

In step 440, the re-enable time, i.e., the time at which to re-enable the disabled interface over which video data and control messages are transmitted from graphics controller device 101 to timing controller device 102, for example, interface 104, is determined. For example, output stutter control device 206 may determine the re-enable time based on a known and/or fixed frame-interval and the end of the previous frame. In another embodiment, timing generator device 205 may trigger an event in output stutter control device 206 to indicate the re-enable time.

In step 450, the interface over which video data and control messages are transmitted from graphics controller device 101 to timing controller device 102, for example, interface 104, is re-enabled. Re-enabling of interface 104 can include restarting data transmission out of output driver device 207. In some embodiments re-enabling interface 104, can include triggering other components such as, for example, display pipeline 203 and encoder 205 to re-start processing video. Also, in some embodiments the re-enabling of interface 104 may include powering-on interface 104, if it had been powered down previously or if it had been transitioned to a low power mode.

In step 460, subsequent to interface 104 being re-enabled, the next frame of video is transmitted by output driver device 207 over interface 104. In general, the total time elapsed between the end of transmission of the first frame and the beginning of transmission of the second frame is maintained as a fixed and/or known frame interval. All of the processing required, for example, to disable and re-enable the interface according to embodiments of the present invention, is performed within the frame interval.

Figure 5:
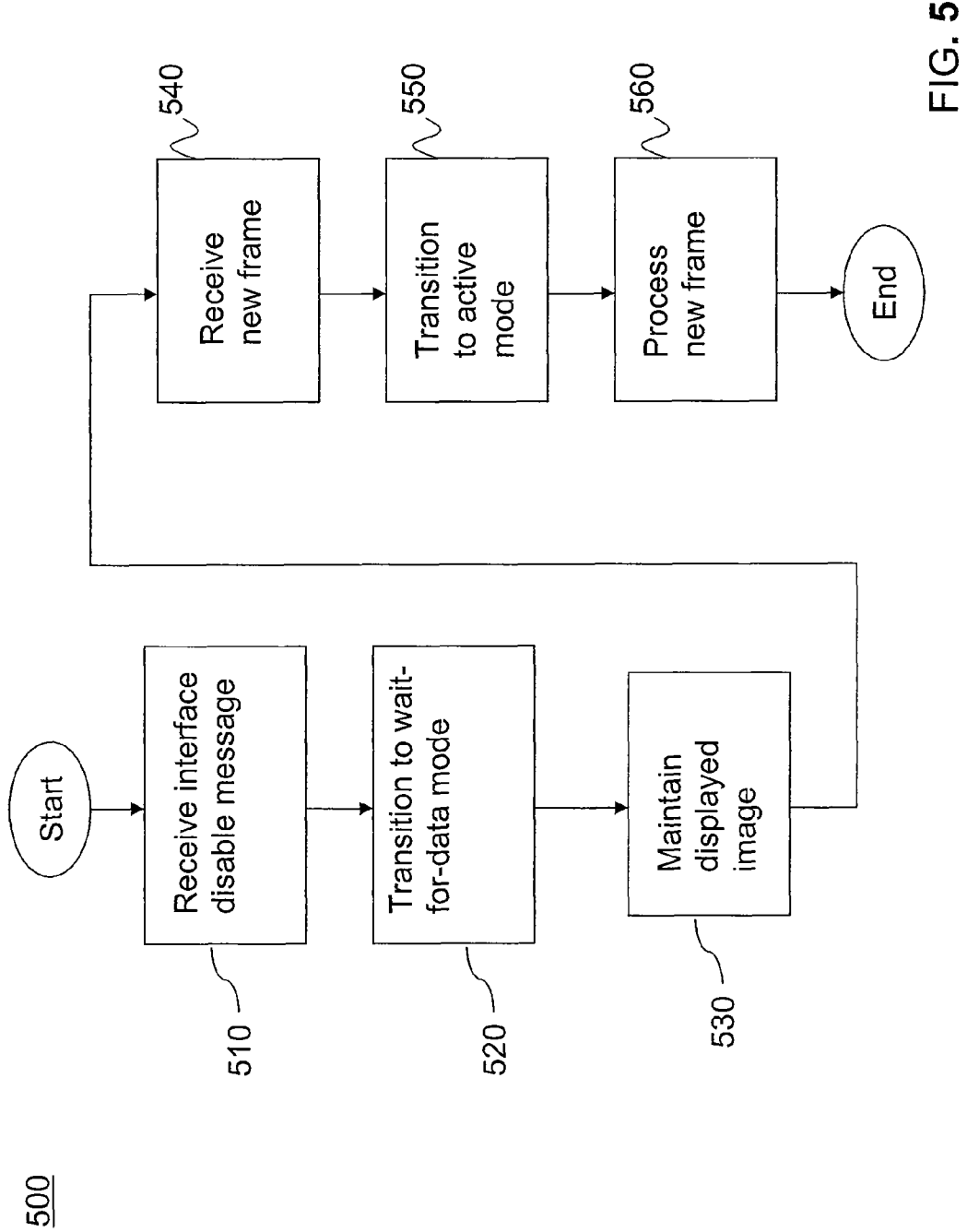
FIG. 5 is a flowchart showing steps in a process implemented in the timing controller device according to an embodiment of the present invention.

FIG. 5 is a flowchart of processing steps that occur in timing controller device 102 according to embodiments of the present invention. In step 510, a message is received from a graphics controller device 101 indicating that the interface 104 will be temporarily disabled. Embodiments of the present invention can implement this notification in one of many ways. In one embodiment, a separate signal line in interface 104 may be used. In another embodiment, a specific message structure can be used. In other embodiments, a message indicating the disabling of the interface can also have other information including the expected interval over which the interface will remain disabled, such that timing controller device 102 has available more information for its processing. The particular structure of the indication will vary according to the interface standard agreed between the graphics controller device 101 and the timing controller device 102.

In step 520 and step 530, timing controller device 102 is transitioned into a wait-for-data mode and the displayed image is maintained on the display, respectively. In the wait-for-data mode, timing controller device 102 and its components may act to maintain the displayed image until the next frame is received. Timing controller device 102 may have to adjust display refresh rates, display clock rates, or repetitively display portions of the same frame during the interval in which interface 104 is disabled.

In step 540, timing controller device 102 detects the receiving of a new video frame. For example, graphics controller device 101 may have transmitted the new frame after the elapse of the frame interval. When the new frame is received at the timing controller device 102, components of the timing controller device transition to normal active mode. The transition to the normal active mode may occur in step 550.

Then in step 560, the new frame is processed for displaying. Processing in timing controller device 102 can include decoding the received video frame and driving the display of the data by outputting the raster scan data through output driver device 307. For example, the decoded video data may be used in output driver device 307 to separately drive column and row display drivers of a LCD display.

In other embodiments, depending on the type of display, the decoded video data may be re-encoded and subjected to a timing recovery process before the data is output from output driver 307. For example, display devices with its own processing capabilities may require such re-encoding and/or timing recover. Re-encoding may involve the encoding of the video data into a compressed or uncompressed video encoding format. For example, encoder 305 may perform the re-encoding using video data in frame buffer 304. Timing recovery may be performed by timing device 306 based on data received at receiver 302 and/or decoder 303.

In some embodiments, timing controller device 102 can also include a protection circuit (not shown) that will trigger a reset, or recovery process, when a predetermined error condition is detected. For example, subsequent to timing controller device 102 having transitioned to the wait-for-data state in step 520 of process 500, if no new frame is received within a predetermined time period, where the time period can be set based on the frame interval, the protection circuit will determine that an error condition has occurred and reset timing controller device 102. A protection circuit may, in some embodiments, generate dummy frames for a preconfigured time interval when no frames are received from graphics controller device 101. Similar protection mechanisms may be available for other components of the system 100.

In another embodiment, the present invention may be implemented on the interface between a timing controller device and a display device. For example, an embodiment of the present invention may be used to reduce the power consumption of interface 105 between timing controller device 102 and display device 103. The principals of operation would be similar to that explained above with respect to interface 104. Specifically, an output stutter control device will be coupled to output driver 307 of the timing controller device and a corresponding receiver control device will be coupled to a receiver on the display device. In enabling and disabling interface 105, the output stutter control device coupled to output driver 307 of the timing controller device 102 may function similarly to output stutter control device 206. In responding to the enabling and disabling of interface 105, the receiver control device of the display device 103 may function similarly to the receiver output stutter control device 308.

In the description above, embodiments of the present invention have been described with respect to one or more display devices. One skilled in the art will also recognize that the teachings herein can be applied to many other devices where data is transferred from one device to another over an interface that can be powered on or off. Other devices in which embodiments of the present invention can be practiced include, for example, audio or multimedia devices in which audio or multimedia data is transferred over an interface. As noted above, embodiments of the present invention are particularly advantageous in power-constrained environments, such as, for example, battery operated devices. However, significant power savings may also be realized using embodiments of the present invention, in alternate current powered devices that remain powered-on for long periods. For example, an embodiment of the present invention may be implemented to reduce the power-consumed by the HDMI-interface between a television decoder and the television display.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of reducing power consumption for transferring data frames of a video stream over a data transfer interface between a first device and a second device, the method comprising:

determining, by the second device, whether (a) the video stream is completed or terminated or (b) the data transfer interface is disabled after a notification;

notifying the second device over the data transfer interface that the data transfer interface will be disabled temporarily;

disabling the data transfer interface upon completion or termination of a first frame of the video stream for an interval between the first frame and a subsequent second frame;

in response to the second device determining that the data transfer interface is disabled after the notification, enabling the data transfer interface at the end of the interval; and transmitting the second frame.

2. The method of claim 1, further comprising:
   detecting the end of the first frame; and
   detecting that the first frame is not a last frame, wherein the last frame indicates the end of the video stream.

3. The method of claim 1, wherein, the disabling comprises:
   powering-off the data transfer interface.

4. The method of claim 1, wherein the first device is a graphics controller.

5. The method of claim 4, wherein the enabling comprises:
powering-on the data transfer interface; and
re-initializing a startup sequence in an encoder in the graphics controller.

6. The method of claim 4, wherein the second device is a timing controller.

7. The method of claim 1, wherein the first device and the second device correspond to a timing controller and a display, respectively.

8. The method of claim 1, wherein notifying the second device further comprises using a control message.

9. The method of claim 1, wherein notifying the second device further comprises using a data packet.

10. The method of claim 1, wherein the notification is included in the first data frame.

11. The method of claim 1, wherein the disabling comprises:
transitioning the data transfer interface into a low-power mode.

12. A system comprising:
a graphics controller configured to transmit data frames of a video stream to a timing controller over a data transfer interface;
the timing controller configured to determine whether (a) the video stream is completed or terminated or (b) the data transfer interface is disabled after a notification;
the graphics controller further configured to:
communicate with the timing controller over the data transfer interface;
notify the timing controller over the data transfer interface that the data transfer interface will be disabled temporarily upon completion or termination of a first frame of the video stream;
disable the data transfer interface during an interval between the first and a second video frame; and
when the timing controller determines that the data transfer interface is disabled after the notification, enable the data transfer interface at the end of the interval.

13. The system of claim 12, wherein the graphics controller is further configured to notify using a control message.

14. The system of claim 12, wherein the graphics controller is further configured to notify using a data packet.

15. A display apparatus, comprising:
a graphics controller;
a timing controller configured to:
receive data frames of a video stream over a data transfer interface; and
determine whether (a) the video stream is completed or terminated or (b) the data transfer interface is disabled after a notification;
the data transfer interface coupling the graphics controller and the timing controller;
an output stutter control module coupled to the data transfer interface and to the graphics controller, wherein the output stutter control module is configured to:
notify the timing controller over the data transfer interface that the data transfer interface will be temporarily shutdown, upon completion or termination of a first frame of the video stream;
disable the data transfer interface during an interval between the first and a second video frame; and
when the timing controller determines that the data transfer interface is disabled after the notification, enable the data transfer interface at the end of the interval.

16. The display apparatus of claim 15, wherein the data transfer interface is a DisplayPort interface.

17. The apparatus of claim 15, wherein the stutter control module is further configured to notify using a control message.

18. The apparatus of claim 15, wherein the stutter control module is further configured to notify using a data packet.

* * * * *